United States Patent [19]
Herzog

[11] Patent Number: 6,041,514
[45] Date of Patent: *Mar. 28, 2000

[54] IMPELLER FOR A HAIR DRYER

[75] Inventor: Karl Herzog, Frankfurt, Germany

[73] Assignee: Braun GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/979,910

[22] Filed: Sep. 12, 1997

[30] Foreign Application Priority Data

Oct. 4, 1996 [DE] Germany .................... 196 41 099

[51] Int. Cl.[7] .................................................. A45D 20/00
[52] U.S. Cl. .................................. 34/97; 34/96; 239/380
[58] Field of Search .................................. 34/96, 97, 98; 239/380, 383

[56] References Cited

U.S. PATENT DOCUMENTS

| | | | |
|---|---|---|---|
| 4,019,260 | 4/1977 | Levy et al. | 34/97 |
| 4,132,360 | 1/1979 | Lee, Jr. | 239/383 |
| 4,878,620 | 11/1989 | Traleton | 239/383 |
| 5,054,211 | 10/1991 | Shulman | 34/97 |
| 5,161,317 | 11/1992 | McDougall | 34/97 |
| 5,341,578 | 8/1994 | Anderson | 34/97 |
| 5,392,528 | 2/1995 | McDougall | 34/97 |
| 5,720,107 | 2/1998 | Rolf et al. | 34/97 |

FOREIGN PATENT DOCUMENTS

| | | | |
|---|---|---|---|
| 1183345 | 3/1985 | Canada | 34/97 |
| 241 848 A1 | 1/1987 | Germany | A45D 20/12 |
| 682 291 A5 | 8/1993 | Switzerland | A45D 20/10 |
| 682 293 A5 | 8/1993 | Switzerland | A45D 20/10 |
| 1105865 | 3/1968 | United Kingdom | F04D 29/34 |
| 1231581 | 5/1971 | United Kingdom | F01D 7/00 |
| 2006337 | 5/1979 | United Kingdom | F04D 29/66 |
| 2017212 | 10/1979 | United Kingdom | F04D 29/38 |
| 2055981 | 3/1981 | United Kingdom | F04D 29/38 |
| 2268060 | 1/1994 | United Kingdom | A45D 20/12 |

*Primary Examiner*—Henry Bennett
*Assistant Examiner*—Pamela A. Wilson
*Attorney, Agent, or Firm*—Edward S. Podszus

[57] ABSTRACT

The invention is directed to an impeller (1) for a hair dryer or a hair dryer accessory device, which includes an impeller blade (6) by means of which the impeller (1) is adapted to be set in rotation about an axis (3) by a current of air (8). The impeller blade (6) possesses variable aerodynamic properties, particularly an effective surface impinged by the current of air (8) which is variable in response to the rotational frequency of the impeller blade (6). In particular the free end (7) of the impeller blade (6) is of an elastic configuration, causing it to be bent more or less severely under the action of the centrifugal force. This variation in the effective surface of the impeller blade (6) enables the rotational frequency of the impeller (1) to be maintained at an approximately constant value.

23 Claims, 5 Drawing Sheets

IMPELLER FOR A HAIR DRYER

This invention relates to an impeller, in particular a turbine impeller for a hair dryer or a hair dryer accessory device, which is adapted to be set in rotation about an axis by a streaming medium, particularly a current of air, including at least one impeller blade that is adapted to be impinged upon by the streaming medium.

An impeller of this type is known from accessory devices for electric hair dryers. In these devices the impeller is positioned in the current of air produced by a fan driven by an electric motor. With the help of the impeller blade the impeller is set in rotation about its axis by the current of air. The impeller is also equipped with a pulsator screen which causes the current of air to be deflected in a circular path and/or interrupted. This results in a pulsating current of air which fluffs the user's hair. The time required to dry the hair is thus shortened and the hair subjected to less stress.

The rotational frequency of the impeller depends, inter alia, on the velocity and/or volume of air impinging upon the impeller blade. These parameters are conventionally adjustable on an electric hair dryer. By contrast, the frequency of the pulsating air current created by the pulsator screen should remain approximately constant. This can be achieved by means of centrifugal regulators, for example, which under the action of centrifugal force generate a braking friction that grows with increasing rotational frequency and hence slows down the impeller to an approximately constant rotational frequency.

It is an object of the present invention to devise an impeller, in particular for a hair dryer or a hair dryer accessory device, whose rotational frequency is adjustable by simple means to an approximately constant value even under various conditions of the streaming medium.

According to the present invention, this object is accomplished with an impeller of the type initially referred to in that the aerodynamic properties of the impeller blade, particularly the impinged effective surface and/or the pitch angle and/or the profile and/or similar, are variable as a function of the impeller blade's rotational frequency.

Any variation in the streaming medium's flow conditions causes the rotational frequency of the impeller to vary as well. In accordance with this invention, this change of rotational frequency, results first of all in a change of the impeller blade's aerodynamic properties; in particular, the impeller blade's effective surface and/or pitch angle becomes larger or smaller and/or its profile and/or the like is changed. This, in turn, causes the impeller's rotational frequency to change once again, namely in opposite direction to the first change of rotational frequency. The impeller's rotational frequency thus adopts an approximately constant value on the whole. Hence the impeller maintains an approximately constant rotational frequency which is independent of any variations in the medium driving the impeller.

In an advantageous embodiment of the impeller of the present invention, at least one propeller blade, whose aerodynamic properties are variable in response to the impeller's rotational frequency, is provided as the impeller blade. As a result, the changed aerodynamic properties exert an influence on the propelling effect of the propeller blade and hence on the impeller's rotational frequency. If the velocity and/or volume of the streaming medium increases, the effective surface of the propeller blade is decreased, for example. This, in turn, results in less propulsion from the propeller blade so that the impeller's rotational frequency remains approximately constant on the whole.

In an advantageous further feature of the impeller of the present invention, the propeller blade has a free end which is aligned radially inwardly toward the axis. At least the free end of the propeller blade is variable in its aerodynamic properties, particularly its effective surface. As the velocity and/or volume of the streaming medium increases, this arrangement results, for example, in this free end changing to the extent that its effective surface becomes smaller. The higher velocity and/or larger volume of the streaming medium thus acts to a lesser degree on the propeller blade so that the impeller's rotational frequency remains approximately constant on the whole.

In an advantageous further feature of the impeller of this invention, provision is made for a circumferential rim from which the propeller blade projects radially inwardly toward the axis. By this simple means the free end of the propeller blade is thus aligned inwardly toward the axis. The circumferential rim is easy to manufacture and has advantages, therefore, also with regard to the cost of the impeller.

In an advantageous embodiment of the impeller of this invention, provision is made for at least one propeller blade and at least one brake blade, and the aerodynamic properties of the brake blade are variable as a function of the impeller's rotational frequency. In this embodiment, for example, the effective surface of the impeller's brake blade is varied. Consequently, the changed effective surface exerts an influence on the braking effect of the brake blade and hence on the impeller's rotational frequency. If the velocity and/or volume of the streaming medium is increased, for example, the effective surface of the brake blade is enlarged. The braking effect of the brake blade is thereby increased, and the impeller's rotational frequency thus remains approximately constant on the whole.

In an advantageous further feature of the impeller of the present invention, the brake blade has a free end which is aligned radially outwardly from the axis. At least the free end of the brake blade is variable with regard to its aerodynamic properties. As the velocity and/or volume of the streaming medium increases, this arrangement results, for example, in this free end changing to the extent that its effective surface is enlarged. The higher velocity and/or larger volume of the streaming medium thus acts to a greater degree on the brake blade so that the impeller's rotational frequency remains approximately constant on the whole.

In an advantageous further feature of the impeller of the present invention, provision is made for a hub locating the axis, from which hub the brake blade projects radially outwardly. By this simple means the free end of the propeller blade is thus aligned outwardly from the axis. The hub is necessary for locating the axis, meaning that it does not represent an additional component and so does not incur any additional production costs.

Particularly suitably, the variation in the aerodynamic properties of the impeller's propeller blade is combined with the variation in the aerodynamic properties of the impeller's brake blade. It is thus possible in particularly advantageous manner to maintain the impeller's rotational frequency at an approximately constant value.

In an advantageous embodiment of the impeller of the present invention, the impeller blade has a propeller zone or a propeller part and a brake zone or a brake part, and the aerodynamic properties of the brake zone or brake part are variable as a function of the impeller's rotational frequency. Hence in this embodiment provision is made for just one impeller blade having two zones or two parts. Of these two zones or parts the aerodynamic properties of the impeller blade's brake zone or brake part are changed. In consequence, the changed properties exert an influence on the braking effect of the brake zone or the brake part and hence on the impeller's rotational frequency. If the velocity and/or volume of the streaming medium is increased, for example, the effective surface of the brake zone or the brake part is enlarged. As a result, the braking effect is enhanced and the impeller's rotational frequency thus remains approximately constant on the whole.

In an advantageous further feature of the impeller of the present invention, the brake zone or the brake part has a free end which is aligned radially outwardly from the axis. At least the free end of the brake zone or brake part of the impeller blade is variable with regard to its aerodynamic properties. As the velocity and/or volume of the streaming medium increases, this arrangement results, for example, in this free end changing to the extent that its effective surface is enlarged. The higher velocity and/or larger volume of the streaming medium thus acts to a greater degree on the brake zone or the brake part so that the impeller's rotational frequency remains approximately constant on the whole.

Particularly suitably, the variation in the aerodynamic properties of the impeller blade's brake zone or brake part is combined with the previously mentioned variations in the aerodynamic properties of a propeller blade and/or a brake blade. It is thus possible in particularly advantageous manner to maintain the impeller's rotational frequency at an approximately constant value.

It is particularly suitable, furthermore, to make provision not for one but for two or more propeller blades with variable aerodynamic properties, and/or not for one but for two or more brake blades with variable aerodynamic properties, and/or not for one but for two or more impeller blades with variable aerodynamic properties of the brake zone or the brake part. Greater precision in adjusting the impeller's rotational frequency to an approximately constant value is thus possible.

In an advantageous embodiment of the impeller of the present invention, the impeller blade, whose aerodynamic properties are variable as a function of the impeller's rotational frequency, is constructed to be partly elastic at least in the area of its free end. The elastic construction of the impeller blade helps achieve the variation in the aerodynamic properties, for example, of the impeller blade's effective surface. As the velocity and/or volume of the streaming medium increases, for example, the rotational frequency of the impeller blade rises. This represents an increase in the centrifugal force acting on the impeller blade. The increased centrifugal force results, in turn, in the elastic free end of the impeller blade, for example, bending radially outwardly. The aerodynamic properties of the impeller blade change accordingly. With a propeller blade according to this invention, the centrifugal force causes the aerodynamic properties of the propeller blade to be diminished and hence the impeller's rotational frequency to be reduced. With a brake blade according to this invention, the centrifugal force causes, for example, the effective surface of the brake blade to be enlarged and hence the braking effect to be enhanced and the impeller's rotational frequency to be reduced. It is thus possible, as a result of the elastic construction of the impeller blade at least in the area of its free end, to maintain the impeller's rotational frequency approximately constant on the whole.

Figure 15:
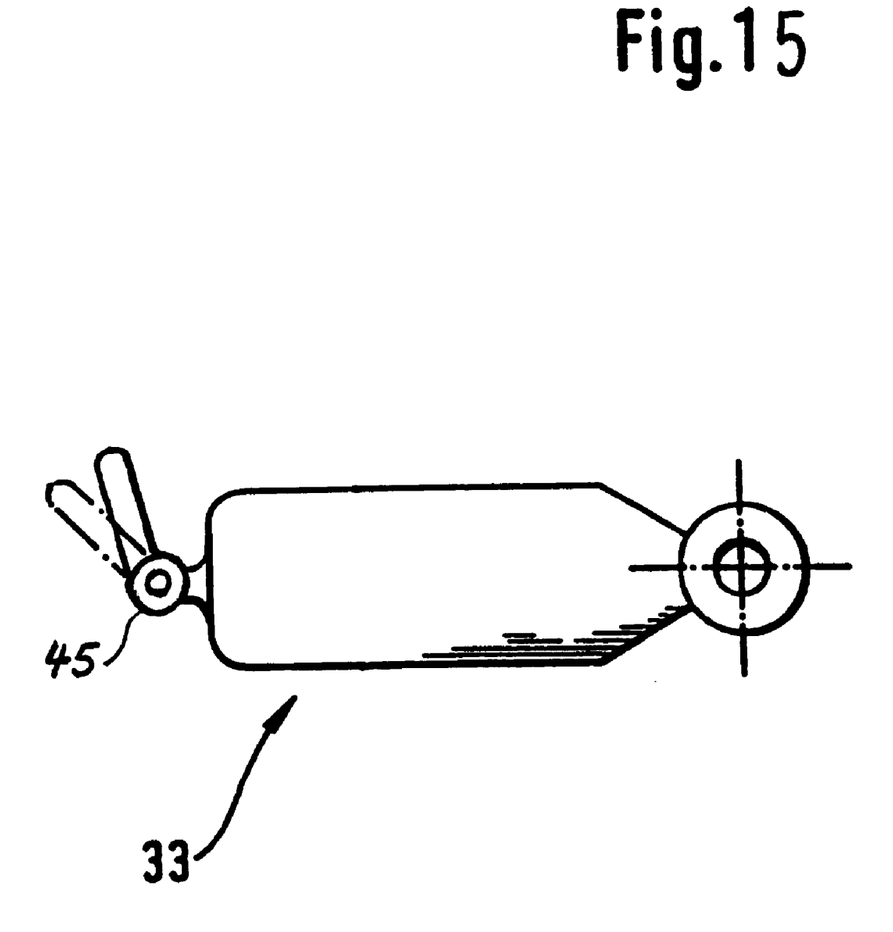
FIG. 15 is a schematic top view of a modified impeller of the type shown in FIG. 12.

In an advantageous embodiment of the impeller of the present invention, the impeller blade, whose aerodynamic properties are variable as a function of the impeller's rotational frequency, has movable parts held by joints and/or springs (element 45 in FIG. 15) at least in the area of its free end. With the help of these movable parts together with the joints and/or springs, a suitable construction can achieve results similar to those achievable by means of the elastic construction of at least the free end of the impeller blade.

In an advantageous embodiment of the impeller of the present invention, provision is made for a screen, in particular a pulsator screen for a hair dryer or a hair dryer accessory device, which is arranged diametrically opposite the impeller blade whose aerodynamic properties are variable in response to the impeller's rotational frequency. The impeller blade and the screen can be constructed so that the impeller is balanced on the whole. Extremely smooth running of the impeller is thus accomplished.

It is also possible, however, for the impeller to have only one or several impeller blades which results in the impeller being inherently unbalanced. In a hair dryer the impeller thus gives rise to vibrations propagating, inter alia, to the housing and hence also to a hair dryer's accessory device which can be placed on the user's scalp. The user experiences the vibrations produced by the impeller as a scalp massage.

In a particularly advantageous further feature of this invention, a hair dryer or a hair dryer accessory device of the type commercially available is proposed, which contains an impeller as described above. The previously described advantages of an impeller thus apply also to a hair dryer or a hair dryer accessory device.

Further features, advantages and application possibilities of the present invention will become apparent from the subsequent description of embodiments illustrated in more detail in the accompanying drawings. It will be understood that any single feature and any combination of single features described and/or represented by illustration form the subject-matter of the present invention, irrespective of their summary in the claims and the back-references thereof.

Figures 1, 3:
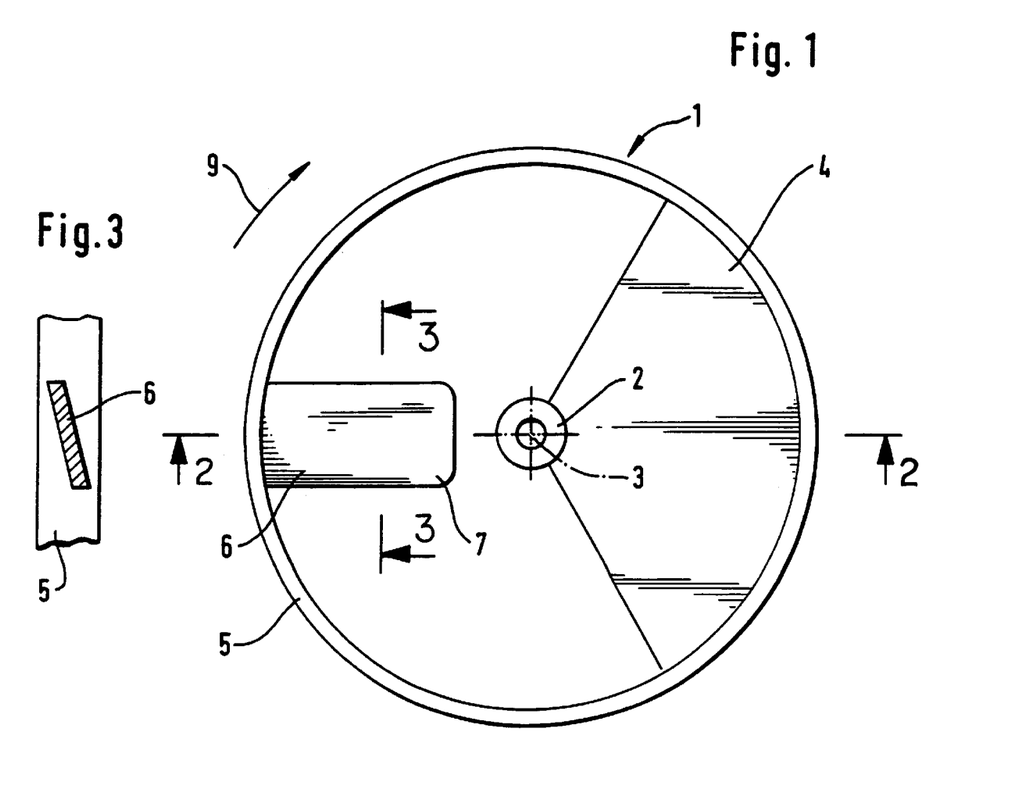
FIG. 1 is a schematic top view of a first embodiment of an impeller of this invention.
FIG. 3 is a schematic sectional view of the propeller blade of the impeller, taken along the plane B—B of FIG. 1.
Figure 2:
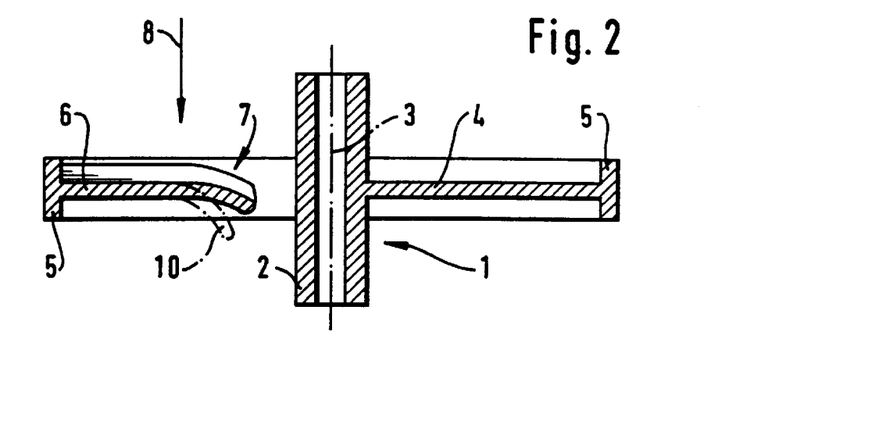
FIG. 2 is a schematic sectional view of the impeller, taken along the plane A—A of FIG. 1.

In the drawings:

FIGS. 1 to 3 show an impeller 1 designed to be installed in a hair dryer or a hair dryer accessory device, which is not shown for the sake of simplicity. The hair dryer can be equipped, for example, with a fan driven by an electric motor, the fan producing on activation a current of air to dry the user's hair.

The impeller 1 has a hub 2 intended to accommodate a journal (not shown). The journal is arranged approximately parallel to the air current produced by the fan in the direction of an axis 3 and is held in or on the hair dryer. The impeller 1 is rotatably mounted on the journal.

A pulsator screen 4 projects radially outwardly from the hub 2. The pulsator screen 4 extends over an angular range of approximately 100 degrees and in this area is constructed as a plane segment of a circular disk. The pulsator screen 4 causes the current of air to be deflected in a circular path and/or interrupted.

Fitted to the edge of the pulsator screen 4 is a circumferential rim 5 describing a complete circle around the axis 3.

A propeller blade 6 is held on the circumferential rim 5 on the side of the impeller 1 diametrically opposite the pulsator screen 5. The propeller blade 6 is a blade of the impeller 1 and projects radially inwardly from the circumferential rim 5 in the direction of the axis 3. The propeller blade 6 is not connected to the hub 2 but has a free end 7 which is aligned radially inwardly toward the axis 3.

The propeller blade 6 has a left-hand pitch, and at least the free end 7 of the propeller blade 6 is elastic in construction so that in this embodiment, as in all further embodiments, the deformations occur in the elastic area and recovery is automatic. Furthermore, the free end 7 is slightly bent, as becomes apparent from FIG. 2 in particular.

When switched on, the hair dryer produces a current of air 8 which flows in a direction approximately parallel to the axis 3 and is identified in FIG. 2 by an arrow. The current of air 8 impinges upon the impeller 1 and particularly upon its propeller blade 6. As a result of the left-hand pitch of the propeller blade 6, the impeller 1 is set in rotation about the axis 3 by the air current 8, the direction of rotation 9 being identified by an arrow in FIG. 1. If the propeller blade has a right-hand pitch, the direction of rotation is reversed accordingly.

The rotational frequency of the impeller 1 is dependent on the aerodynamic properties of the blade, particularly the surface exposed to the air current 8 and/or the profile and/or the pitch angle of the blade of the impeller 1 and particularly that of the propeller blade 6. The larger this so-called effective area and the steeper the pitch angle, the higher the rotational frequency of the impeller 1 at a constant air current 8.

As the velocity and/or volume of the air current 8 increases, so does the rotational frequency. Consequently, the slightly bent elastic free end 7 of the propeller blade 6 bends more severely on account of the radial outward action of the centrifugal force, as is indicated in FIG. 2 and identified by reference numeral 10. The severer bend has, in turn, the effect that the effective surface of the propeller blade 6 impinged by the air current 8 decreases. The reduced effective surface, on the other hand, causes the rotational frequency of the impeller 1 to decrease.

If the velocity and/or volume of the air current 8 drops, the diminishing rotational frequency and the attendant lower centrifugal force result in an elastic elongation of the free end 7 and hence in an enlargement of the effective surface of the propeller blade 6. This, in turn, results in an increase in the rotational frequency of the impeller 1.

Overall, therefore, the rotational frequency of the impeller 1 adopts an approximately constant value, regardless of any changes in the velocity and/or volume of the air current 8.

FIGS. 4 to 7 show an impeller 11 which like the impeller 1 of FIGS. 1 to 3 is designed to be received in a hair dryer or a hair dryer accessory device. The impeller 11 of FIGS. 4 to 7 has a hub 12 with an axis 13 about which the impeller 11 is rotatable. A pulsator screen 14 projects radially outwardly from the hub 12 and extends as a plane segment over an angular range of 100 degrees, approximately.

Figures 4, 6, 7:
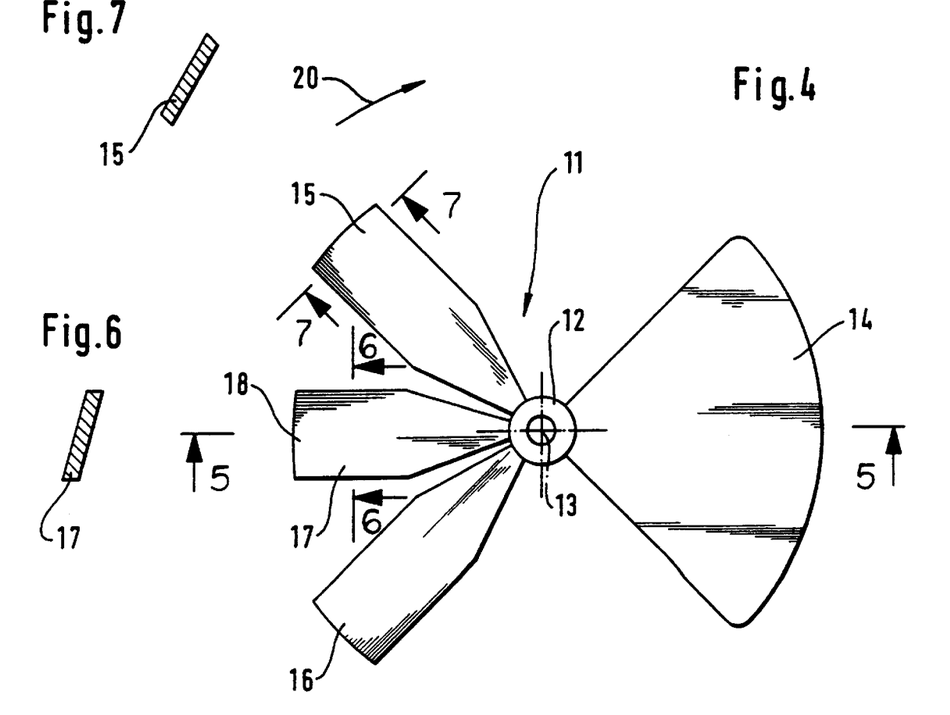
FIG. 4 is a schematic top view of a second embodiment of an impeller of this invention.
FIG. 6 is a schematic sectional view of the brake blade of the impeller, taken along the plane B—B of FIG. 4.
FIG. 7 is a schematic sectional view of the propeller blade of the impeller, taken along the plane C—C of FIG. 4.

Three impeller blades which include two propeller blades 15, 16 and one brake blade 17 project radially outwardly from the hub 12 on the side diametrically opposite to the pulsator screen 14. The propeller blades 15, 16 have a left-hand pitch and are rigid. The brake blade 17 has a right-hand pitch and includes a free end 18 which points radially outwardly from the axis 13. At least the free end 18 of the brake blade 17 is elastic in construction. The free end 18 is also slightly bent, as becomes apparent from FIG. 5 in particular.

Figure 5:
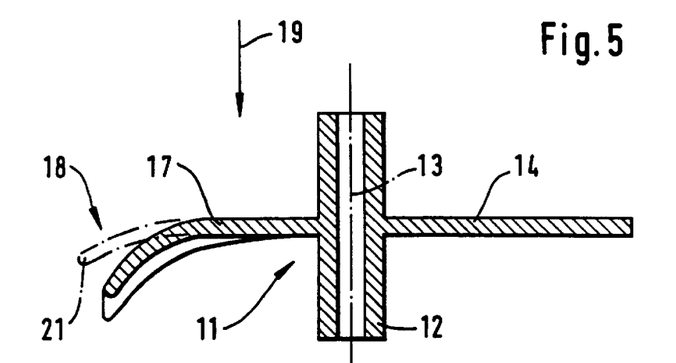
FIG. 5 is a schematic sectional view of the impeller, taken along the plane A—A of FIG. 4.

When switched on, the hair dryer produces a current of air 19 which flows in a direction approximately parallel to the axis 13 and is identified in FIG. 5 by an arrow. The current of air 19 impinges upon the impeller 11 and particularly upon its propeller blades 15, 16. As a result of the left-hand pitch of the propeller blades 15, 16, the impeller 11 is set in rotation about the axis 13 by the air current 19. At the same time, the air current 19 also strikes the brake blade 17 of the impeller 11. As a result of the right-hand pitch of the brake blade 17, the impeller 11 is slowed down.

With proper construction of the propeller blades 15, 16 and the brake blade 17, there results overall a rotation of the impeller 11 in a direction identified in FIG. 4 by an arrow assigned the reference numeral 20.

As a result of the rigid construction of the propeller blades 15, 16, the rotational frequency of the impeller 11 is essentially dependent on the aerodynamic properties, and particularly on the effective surface of the brake blade 17 impinged by the air current 19. The larger this effective surface, the lower the rotational frequency of the impeller 11 at a constant air current 19.

If the rotational frequency of the impeller 11 increases as a result of a greater velocity and/or volume of the air current 19, the elastic free end 18 of the brake blade 17 stretches on account of the radial outward action of the centrifugal force, producing a larger effective surface of the brake blade 17. This is indicated in FIG. 5 and identified by the reference numeral 21. The increased effective surface of the brake blade 17 enhances the braking effect, causing the rotational frequency of the impeller 11 to decrease. By contrast, if the velocity and/or volume of the air current 19 decreases, the elastic free end 18 of the brake blade 17 bends more severely, thereby reducing the effective surface. Consequently, the braking effect of the brake blade 17 decreases while the rotational frequency of the impeller 11 increases.

Overall, therefore, the rotational frequency of the impeller 11 adopts an approximately constant value, regardless of any changes in the velocity and/or volume of the air current 19.

FIGS. 8 to 11 show an impeller 22 which like the impeller 1 of FIGS. 1 to 3 is designed to be received in a hair dryer or a hair dryer accessory device. The impeller 22 of FIGS. 8 to 11 has a hub 23 with an axis 24 about which the impeller 22 is rotatable. An impeller blade 25 projects radially outwardly from the hub 23. The impeller blade 25 has an elastic free end 26 pointing radially outwardly.

The impeller blade 25 has two zones. In an inner propeller zone 27 on the side close to the hub 23, the impeller blade 25 has a left-hand pitch and is rigid in construction. In an outer brake zone 28 on the side close to the free end 26, the impeller blade 25 has a right-hand pitch. At least the free end 26 up to the entire outer brake zone 28 is elastic in construction and slightly bent in shape, as becomes apparent from FIG. 9 in particular. The inner propeller zone 27 is larger than the outer brake zone in its radial dimension. A transitional zone 29 between the inner propeller zone 27 and the outer brake zone 28 is narrow in its radial dimension.

Figure 9:
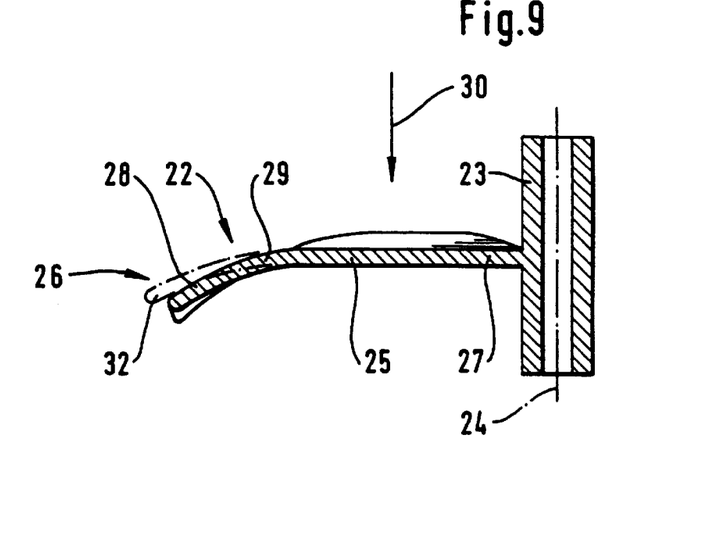
FIG. 9 is a schematic sectional view of the impeller, taken along the plane A—A of FIG. 8.
Figure 11:
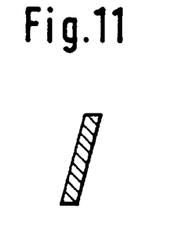
FIG. 11 is a schematic sectional view of the impeller blade of the impeller, taken along the plane C—C of FIG. 8.

When switched on, the hair dryer produces a current of air 30 which flows in a direction approximately parallel to the axis 24 and is identified in FIG. 9 by an arrow. The current of air 30 impinges upon the impeller 22 and particularly upon its impeller blade 25. As a result of the left-hand pitch of the inner propeller zone 27 of the impeller blade 25, the impeller 22 is set in rotation about the axis 24 by the air current 30. At the same time, the air current 30 also strikes the outer brake zone 28 of the impeller blade 25. As a result of the right-hand pitch of the outer brake zone 28, the impeller 22 is slowed down.

Figures 8, 10:
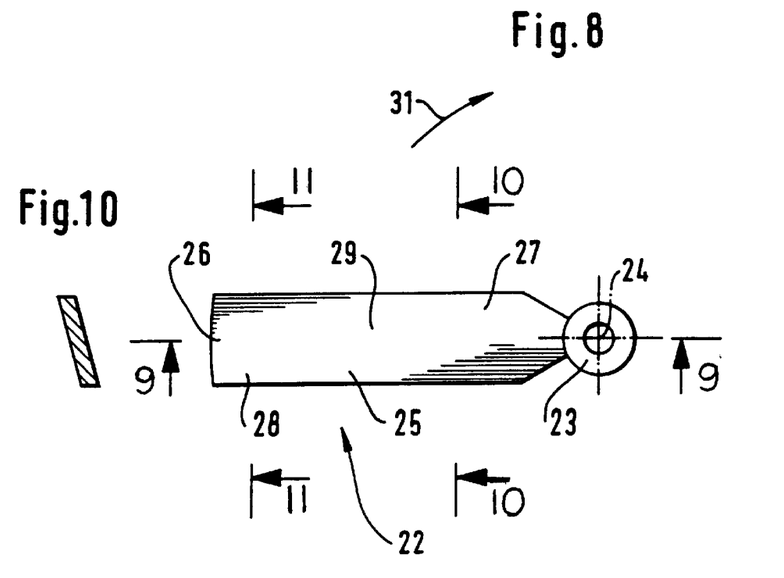
FIG. 8 is a schematic top view of a third embodiment of an impeller of this invention.
FIG. 10 is a schematic sectional view of the impeller blade of the impeller, taken along the plane B—B of FIG. 8.

With proper construction of the inner propeller zone 27 and the outer brake zone 28 of the impeller blade 25, particularly as a result of the ratio between the radial dimensions of the inner propeller zone 27 and the outer brake zone 28, there results overall a rotation of the impeller 22 in a direction identified in FIG. 8 by an arrow assigned the reference numeral 31.

As a result of the rigid construction of the inner propeller zone 27 of the impeller blade 25, the rotational frequency of the impeller 22 is essentially dependent on the aerodynamic properties, and particularly on the effective surface of the outer brake zone 28 of the impeller blade 25 impinged by the air current 30. The larger this effective surface, the lower the rotational frequency of the impeller 22 at a constant air current 30.

If the rotational frequency of the impeller 22 increases as a result of a greater velocity and/or volume of the air current 30, the elastic free end 26 of the outer brake zone 28 stretches on account of the radial outward action of the centrifugal force, producing a larger effective surface of the impeller blade 25. This is indicated in FIG. 9 and identified by the reference numeral 32. The increased effective surface of the outer brake zone 28 enhances the braking effect so that the rotational frequency of the impeller 22 decreases. By contrast, if the velocity and/or volume of the air current 30 decreases, the elastic free end 26 of the outer brake zone 28 bends more severely, thereby reducing the effective surface. Consequently, the braking effect of the impeller blade 25 decreases while the rotational frequency of the impeller 22 increases.

Overall, therefore, the rotational frequency of the impeller 22 adopts an approximately constant value, regardless of any changes in the velocity and/or volume of the air current 30.

Figure 12:
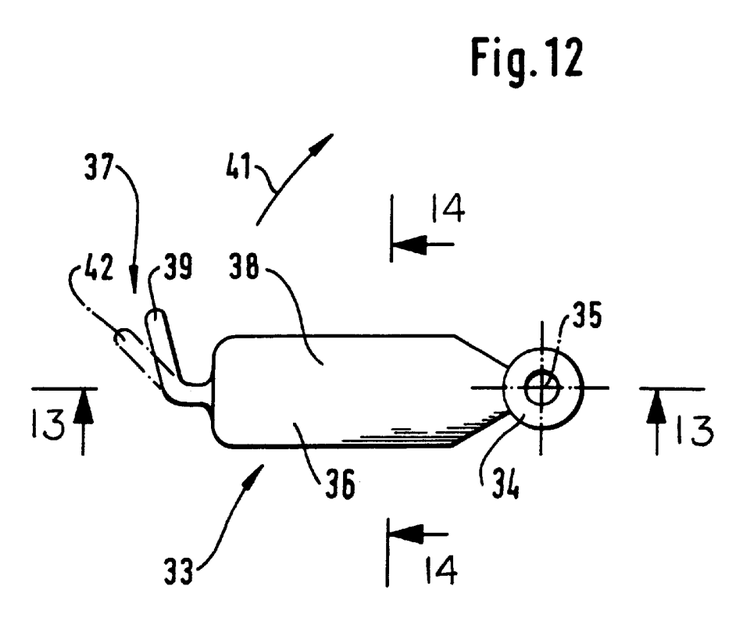
FIG. 12 is a schematic top view of a fourth embodiment of an impeller of this invention.
Figure 13:
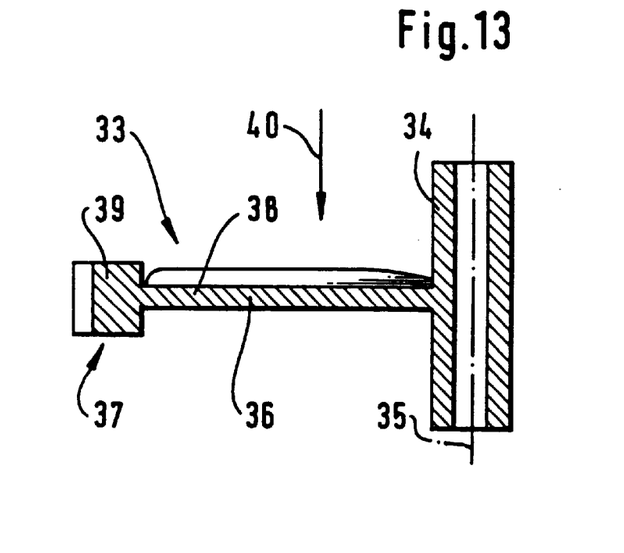
FIG. 13 is a schematic sectional view of the impeller, taken along the plane A—A of FIG. 12.
Figure 14:
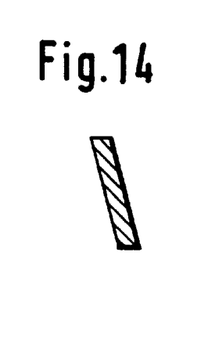
FIG. 14 is a schematic sectional view of the impeller blade of the impeller, taken along the plane B—B of FIG. 12.

FIGS. 12 to 14 show an impeller 33 which like the impeller 1 of FIGS. 1 to 3 is designed to be received in a hair dryer or a hair dryer accessory device. The impeller 33 of FIGS. 12 to 14 has a hub 34 with an axis 35 about which the impeller 33 is rotatable. An impeller blade 36 projects radially outwardly from the hub 34. The impeller blade 36 has an elastic free end 37 which in the static state points tangentially outwardly.

The impeller blade 36 has two parts. An inner propeller part 38 on the side close to the hub 34 has a left-hand pitch and is rigid in construction. An outer brake part 39 adjoining the propeller part 38 and forming the free end 37 has a tangential pitch angle. This outer brake part 39 is elastic in construction and has the form of a bent surface, as becomes apparent from FIGS. 12 and 13 in particular.

When switched on, the hair dryer produces a current of air 40 which flows in a direction approximately parallel to the axis 35 and is identified in FIG. 13 by an arrow. The current of air 40 impinges upon the impeller 33 and particularly upon its impeller blade 36. As a result of the left-hand pitch of the inner propeller part 38 of the impeller blade 36, the impeller 33 is set in rotation about the axis 35 by the air current 40. At the same time, the air current 40 also strikes the outer brake part 39 of the impeller blade 36. As a result of the bent surface of the brake part 39, the impeller 36 is slowed down.

With proper construction of the inner propeller part 38, there results a rotation of the impeller 33 in a direction identified in FIG. 12 by an arrow assigned the reference numeral 41.

As a result of the rigid construction of the inner propeller part 38 of the impeller blade 36, the rotational frequency of the impeller 33 is essentially dependent on the effective surface of the outer elastic brake part 39 of the impeller blade 36. The larger this effective surface, the lower the rotational frequency of the impeller 33 at a constant air current 40.

If the rotational frequency of the impeller 33 increases as a result of a greater velocity and/or volume of the air current 40, the elastic free end 37 of the impeller blade 36 stretches on account of the radial outward action of the centrifugal force. This causes the bent surface of the outer brake part 39 to project further out, producing a larger effective surface of the impeller blade 36. This is indicated in FIG. 12 and identified by the reference numeral 42. The increased effective surface of the outer brake part 39 enhances the braking effect, so that the rotational frequency of the impeller 33 decreases. By contrast, if the velocity and/or volume of the air current 40 decreases, the elastic free end 37 of the impeller blade 36 bends more severely, thereby reducing the effective surface. Consequently, the braking effect of the impeller blade 36 decreases while the rotational frequency of the impeller 33 increases.

Overall, therefore, the rotational frequency of the impeller 33 adopts an approximately constant value, regardless of any changes in the velocity and/or volume of the air current 40.

I claim:

1. An impeller adapted for use with a hair treatment appliance producing a fluid stream for impinging the impeller, comprising a rotation axis about which the impeller is rotatable in response to the impinging fluid stream, and an impeller blade having an aerodynamic characteristic variable in response to a rotational frequency of the impeller, whereby the impeller self-regulates its speed.

2. An impeller according to claim 1, wherein the variable aerodynamic characteristics is an effective impingement surface area of the impeller blade.

3. An impeller according to claim 2, wherein the effective surface area increases with an increase of the impinging fluid stream.

4. An impeller according to claim 1, wherein the variable aerodynamic characteristic is a pitch angle of the impeller blade.

5. An impeller according to claim 1, wherein the variable aerodynamic characteristic is a profile of the impeller blade.

6. An impeller according to claim 1, further comprising at least one propeller blade, the impeller blade being formed at a portion of the at least one propeller blade.

7. An impeller according to claim 6, wherein the at least one propeller blade has a free terminal portion extending radially inward towards the axis.

8. An impeller according to claim 6, further comprising a circumferential rim from which said at least one propeller blade extends radially inward towards the axis.

9. An impeller according to claim 1, further comprising
at least one propeller blade producing in response to the impinging fluid stream a rotational force tending to rotate the impeller in a first direction, and
wherein the impeller blade in response to an increased impeller rotational frequency acts to decrease the rotational force tending to rotate the impeller in the first direction.

10. An impeller according to claim 9, wherein the impeller blade is configured as a brake blade producing a retarding force acting opposed to the rotational force produced by the at least one propeller blade.

11. An impeller according to claim 10, further comprising a hub aligned with the rotation axis, said brake blade extending radially outward from the hub.

12. An impeller according to claim 9, wherein the impeller blade has a free terminal portion extending radially outward from the axis.

13. An impeller according to claim 1, wherein the impeller blade comprises
a propeller blade portion producing in response to the impinging fluid stream a rotational force tending to rotate the impeller in a first direction, and
a brake blade portion having said variable aerodynamic characteristic, wherein said brake blade portion in response to an increased impeller rotational frequency acts to decrease the rotational force tending to rotate the impeller in the first direction.

14. An impeller according to claim 13, wherein the brake blade portion has a free terminal portion extending radially outward from the axis.

15. An impeller according to claim 1, wherein the impeller blade has a free terminal portion, said terminal portion being at least partially elastic.

16. An impeller according to claim 1, wherein the impeller blade has an articulated free terminal segment joined by a movable connection member.

17. An impeller according to claim 1, in combination with the hair treatment appliance.

18. An impeller adapted for use with a hair treatment appliance producing a fluid stream for impinging the impeller, comprising
a rotation axis about which the impeller is rotatable in response to the impinging fluid stream,
a first vane portion producing in response to the impinging fluid stream a rotational force tending to rotate the impeller in a first direction, and
a second vane portion having an aerodynamic characteristic variable in response to a rotational frequency of the impeller, wherein the second vane portion in response to an increase of the impeller rotational frequency due to a change in the impinging fluid stream acts to decrease the rotational force tending to rotate the impeller in the first direction,
whereby the impeller maintains an approximately constant rotational frequency independent of variation in the impinging fluid stream.

19. An impeller according to claim 18, wherein the second vane portion is configured as a brake blade producing a retarding force acting opposed to the rotational force produced by the first vane portion.

20. An impeller adapted for use with a hair treatment appliance producing a fluid stream for impinging the impeller, comprising
a rotation axis about which the impeller is rotatable in response to the impinging fluid stream
an impeller blade having an aerodynamic characteristic variable in relation to a rotational frequency of the impeller, and
further comprising a pulsator screen arranged radially across from the impeller blade.

21. An impeller adapted for use with a hair treatment appliance producing a fluid stream for impinging the impeller, comprising a rotation axis about which the impeller is rotatable in response to the impinging fluid stream, and
an impeller blade having an aerodynamic characteristic variable in relation to a rotational frequency of the impeller,
wherein the variable aerodynamic characteristic is an effective impingement surface area of the impeller blade, and
wherein the effective surface area decreases with an increase of the impinging fluid stream.

22. An impeller adapted for use with a hair treatment appliance producing a fluid stream for impinging the impeller, comprising
a rotation axis about which the impeller is rotatable in response to the impinging fluid stream,
a first vane portion producing in response to the impinging fluid stream a rotational force tending to rotate the impeller in a first direction, and
a second vane portion having an aerodynamic characteristic variable in relation to a rotational frequency of the impeller, wherein the second vane portion in response to an increase of the impeller rotational frequency acts to decrease the rotational force tending to rotate the impeller in the first direction,
whereby the impeller maintains an approximately constant rotational frequency independent of variation in the impinging fluid stream, and
wherein the first vane portion has a pitch opposite to the second vane portion.

23. An impeller adapted for use with a hair treatment appliance producing a fluid stream for impinging the impeller, comprising
a rotation axis about which the impeller is rotatable in response to the impinging fluid stream,
a first vane portion producing in response to the impinging fluid stream a rotational force tending to rotate the impeller in a first direction, and
a second vane portion having an aerodynamic characteristic variable in relation to a rotational frequency of the impeller, wherein the second vane portion in response to an increase of the impeller rotational frequency acts to decrease the rotational force tending to rotate the impeller in the first direction,
whereby the impeller maintains an approximately constant rotational frequency independent of variation in the impinging fluid stream, and
wherein the variable aerodynamic characteristic is an effective impingement surface area of the second vane portion.

* * * * *